United States Patent
Neubauer et al.

[11] Patent Number: 6,156,407
[45] Date of Patent: Dec. 5, 2000

[54] CLEANING CARD FOR MAGNETIC STRIP AND CHIP CARD READ-WRITE DEVICES, METHOD FOR THE PRODUCTION OF SAID CARDS

[75] Inventors: Lutz Neubauer, Wünnenberg-Leiberg; Gerhard Hupe, Salzkotten, both of Germany; Ernst E. Ruch, Wollerau, Switzerland

[73] Assignees: Wincor Nixdorf GmbH & Co. KG, Paderborn, Germany; ECS AG, Baar, Switzerland

[21] Appl. No.: 09/194,227

[22] PCT Filed: Nov. 17, 1997

[86] PCT No.: PCT/EP97/06409

§ 371 Date: Nov. 23, 1998

§ 102(e) Date: Nov. 23, 1998

[87] PCT Pub. No.: WO98/44449

PCT Pub. Date: Oct. 8, 1998

[30] Foreign Application Priority Data

Mar. 29, 1997 [CH] Switzerland ............... 0736/97

[51] Int. Cl.⁷ ................. B05D 1/14; B08B 1/00
[52] U.S. Cl. ............ 428/90; 428/289; 428/286; 15/104.93; 15/104.94; 15/118; 15/210.1; 161/63; 156/244.11
[58] Field of Search ............ 15/104.93, 104.94, 15/210.1, 118; 428/286, 284, 90; 161/63; 156/244.11

[56] References Cited

U.S. PATENT DOCUMENTS

| | | | |
|---|---|---|---|
| 3,029,457 | 4/1962 | Hunder et al. ............ | 15/210 |
| 3,496,054 | 2/1970 | Biagas, Jr. ............ | 161/63 |
| 4,390,387 | 6/1983 | Mahn ............ | 428/90 |
| 4,435,442 | 3/1984 | Hefele ............ | 427/14.1 |
| 4,734,145 | 3/1988 | Monia ............ | 156/244.11 |
| 5,047,103 | 9/1991 | Abrams et a. ............ | 156/72 |
| 5,227,226 | 7/1993 | Rzasa ............ | 428/219 |
| 5,525,417 | 6/1996 | Eyler . | |
| 5,536,328 | 7/1996 | Morgavi ............ | 134/6 |
| 5,832,556 | 11/1998 | Eyler ............ | 15/104.93 |

FOREIGN PATENT DOCUMENTS

| | | | |
|---|---|---|---|
| 0 677 395 | 10/1995 | European Pat. Off. ......... | B41J 29/17 |
| 94 14 719 | 11/1994 | Germany ............ | G11B 5/41 |
| 2 225 747 | 6/1990 | United Kingdom ............ | G11B 5/41 |

*Primary Examiner*—Terrel Morris
*Assistant Examiner*—Christopher C. Pratt
*Attorney, Agent, or Firm*—McCormick, Paulding & Huber LLP

[57] ABSTRACT

The card-shaped plastic carrier 2 of a cleaning card for magnetic track and chip card writing/reading devices is partially layered with a codable material as well as with soft cleaning material. The cleaning material consists of a fiber flock with individual fibers extending essentially perpendicularly from the carrier and tightly packed and adhesively attached to the carrier and having predetermined lengths and predetermined diameters. The codable material is in the form of a pigmented screen printed color printed in several screen printing processes; then on at least side of the card pre-given surface areas for the cleaning material is layered by screen printing processes with a two-component adhesive 8; then the individual fibers are set into the adhesive beds of the individual surface areas essentially perpendicularly; the flat plastic carrier 2 with the layers is subjected to a drying process; and then the nonbonded fibers are washed away.

20 Claims, 3 Drawing Sheets

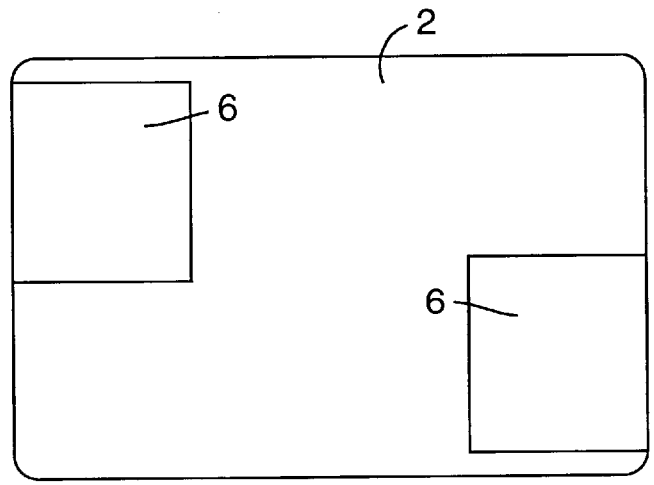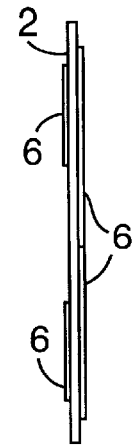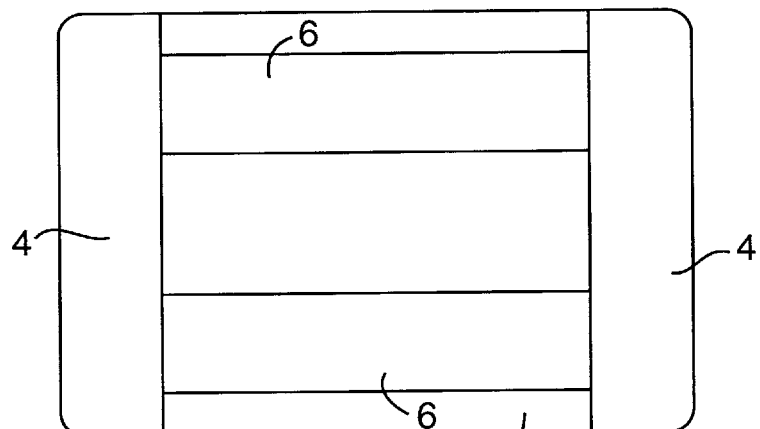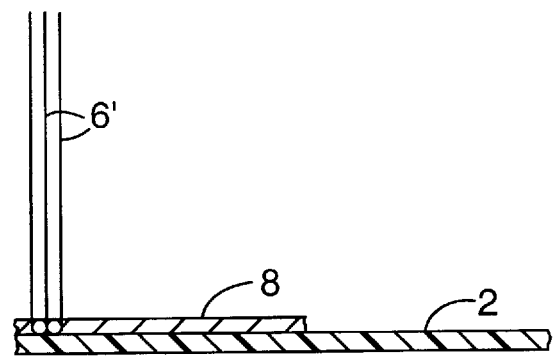

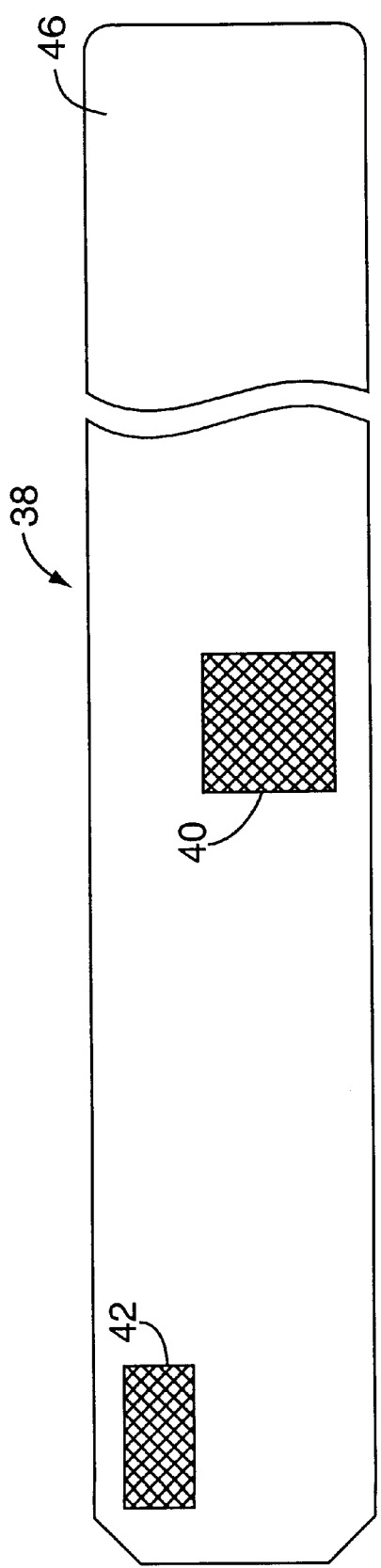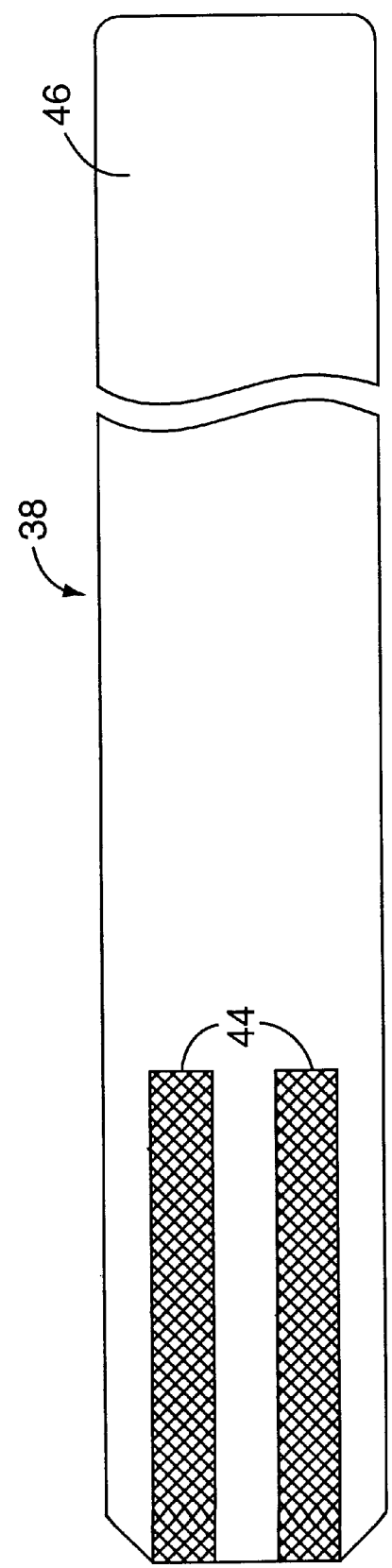

CLEANING CARD FOR MAGNETIC STRIP AND CHIP CARD READ-WRITE DEVICES, METHOD FOR THE PRODUCTION OF SAID CARDS

FIELD OF THE INVENTION

The present invention concerns a cleaning card for magnetic track and chip card writing/reading devices which cleaning card includes a card shaped carrier partially coated with a soft cleaning material arranged on at least one pre-given surface area of the carrier.

BACKGROUND OF THE INVENTION

Cleaning cards for magnetic track writing/reading units, such as, for example, for automatic teller machines of banks and the like, are known and are, for example, described in DE-PS 35 38 223. In such cards, a cleaning felt is provided on one side of a card-shaped PVC carrier between two marginal codable magnetic strips, which felt, upon insertion of the cleaning card into the involved device, slides on the magnetic reading head of the device and cleans it. The cleaning effect can be improved by the preceding application of a cleaning fluid to the felt. However, the cleaning effect obtainable in this way is hardly sufficient to meet today's requirements. Moreover, such cleaning cards are practically unusable for chip card contact stations since a felt sliding along contact springs sensing the upper surface of the chip is not suited to effective cleaning of the contact sites.

A cleaning card is proposed in DE-C-196 22 287 in which a cleaning material carrying slide is built into a carrier corresponding to the chip card measurements, which slide after the insertion of the cleaning card into a writing/reading device can be moved back and forth to clean the contacts. This solution is expensive.

It is, therefore, the object of the present invention to provide a cleaning card, suited by simple means, to clean magnetic track writing and reading heads, as well as chip contact stations, in an absolutely reliable and optimal way.

SUMMARY OF THE INVENTION

The above-object of the invention is solved by a cleaning card of the previously-mentioned kind in accordance with the invention by using as the cleaning material a fiber flock which consists of closely arranged individual fibers of predetermined length and predetermined diameter adhesively attached to the carrier and extending essentially perpendicularly therefrom.

Such fiber flock fields achieve upon insertion of the card into the involved device a quasi-submergence of the magnetic track writing/reading head to be cleaned, as well as of the chip contact stations, into the packed individual fibers with a corresponding deep cleaning by way of a brushing effect.

In order to be able to use such a cleaning card universally with, for example, motorized magnetic card and chip card readers (hybrid readers), manual chip card readers, manual magnetic card plug-in readers, pass-through readers, infrared readers and the like, the fiber flock cleaning material is preferably arranged, on at least one side of the card, at several pre-given surface areas corresponding to the different positions of the to-be-cleaned transmitting means of the involved devices. In connection with this, the individual fibers of the fiber flock cleaning material at the pre-given surface areas on one or the other side of the card can be of the same or different lengths and can be of the same or different diameters.

For cleaning a hybrid writing/reading device, which in addition to a magnetic head for the reading of magnetic strip; and in addition to a chip contact station for the contacting of chip contacts on a chip card, also has an optical sensor for capturing optical characteristics on an identity card, it is advantageous if a first surface area is associated with the chip contact station, a second surface area is associated with an optical sensor, and at least a third surface area is associated with a magnetic head of the writing/reading device.

In a hybrid writing/reading device of the previously-mentioned kind, the optical sensor consists of a fixed block in which a sensor eye is embedded. This embedded eye looks onto one side of identification cards and reads security records not recognizable with bare eyes. Because of the constructionally required recessing of the eye concentrated contamination in the form of lint and dirt particles which arrive at the eye partially from the card and partially by air from outwardly of the card collects at the eye. This sensor eye can not be cleaned with a customary cleaning card which is layered with a felt since the felt layer does not reach into the sensor eye. In contrast, with the cleaning card of the invention which is covered with a fiber flock at surface areas corresponding to the contacts and sensors to be cleaned the sensor eye is reached and cleaned by the fibers. Advantageously, in this case, the length of the fibers of the fiber flock material in the first and second surface areas is about between 6.5 to 10 mm, preferably 8 mm. The fiber thickness in the first and second surface areas is preferably about 33 to 90 dtex, preferably 67 dtex. The fiber flock material in the first and second surface areas work as brushes which reach and clean the contacts of the chip contact station, as well as the sensor eye of the optical sensor.

For the cleaning of the magnetic head, it is, on the other hand, advantageous to use a short fiber material. In this case, the fiber length in the third surface area is about 0.3 to 2 mm, preferably 0.5 to 1 mm. The fiber thickness lies in the area of 1.7 to 6.8 dtex, preferably 3.3 dtex.

The arrangement of the surface areas on the cleaning cards depends on the construction of the writing/reading device, which, in turn, is dependent on the chosen norm for the chip cards to be read.

According to the construction of the writing/reading device, it can be advantageous if the carrier is connected with a grip portion extending in its insertion direction. This facilitates for the service personnel or the operator of the writing/reading device the insertion of the cleaning card from the rear side of the device. The length of the grip section depends therefore on the construction of the writing/reading device.

The cleaning effect is optimized by wet cleaning, for which the fiber flock cleaning material is wetted with a cleaning liquid. This can take place immediately before the use of the card by spraying, or the card can be dipped into a container of cleaning fluid. Preferably the cleaning card is enclosed in a tear-open bag in a condition of being moistened with a liquid cleaning agent.

The present invention further concerns a method for manufacturing a cleaning card for magnetic track and chip card writing/reading devices, in which a flat plastic carrier separable into several cards is partially coated with a soft cleaning material, and as the case may be, with a codable material.

This method is inventively characterized in that if wanted the codable material is applied several times in screen printing processes in the form of a pigmented screen printing color; then on at least one side of the card, pre-given surface areas for the cleaning material are coated in screen printing processes with a two-component adhesive; then to serve as the cleaning material tightly-packed individual fibers of pre-given length and pre-given diameter are set into the adhesive beds of the individual surface areas in a generally perpendicular orientation; then the flat plastic carrier with the coatings is subjected to a drying process; and finally, the non-fastened, remaining fibers are washed away.

Further, the flat plastic carrier can then be cut to form several cleaning cards and the codable surface areas can be coded. Further, the individual cleaning cards are then moistened with a cleaning liquid and each is encased in a tear-open bag.

BRIEF DESCRIPTION OF THE DRAWINGS

Exemplary embodiments of the invention are explained in more detail hereinafter in connection with the drawings which show:

FIG. 1—a plan view of the chip contact side of a cleaning card embodying the invention in at least nearly natural size.

FIG. 2—a side view of the card of FIG. 1.

FIG. 3—a plan view of the magnetic head side of the cleaning card of FIG. 1.

FIG. 4—a cross-section through the cleaning card of FIGS. 1–3 in the area of the area of one fiber Rock field in enlarged scale.

FIG. 7—a plan view of the one side of the cleaning card according to the second embodiment.

FIG. 8—a plan view of the opposite side of the cleaning card pictured in FIG. 7.

DETAILED DESCRIPTION OF THE PREFERRED EMBODIMENTS

Figure 5:
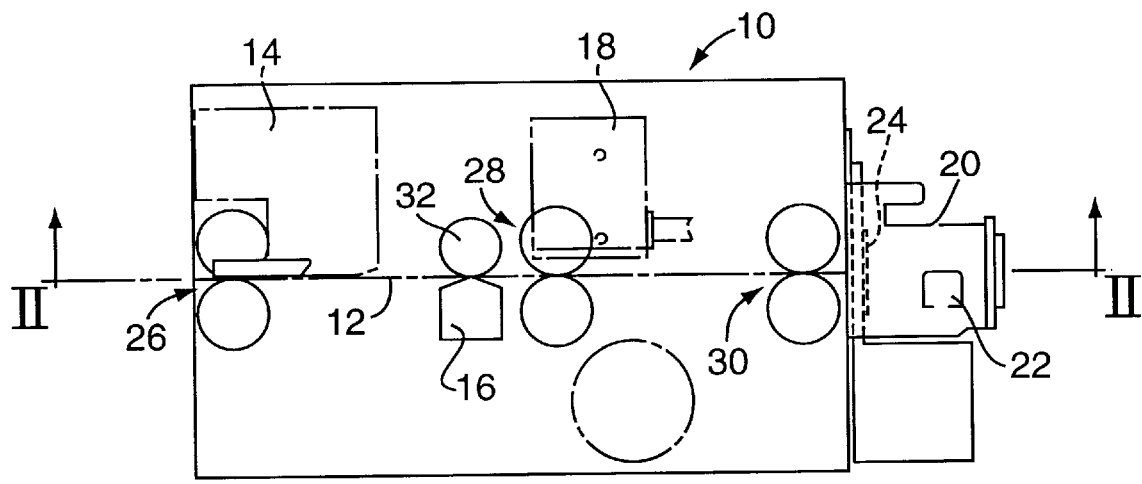
FIG. 5—a schematic side view of a writing/reading device for which a cleaning card according to a second embodiment of the invention is intended.

The card-shaped carrier 2 of a cleaning card according to the invention for magnetic track and chip card writing/reading devices with partial layers 4 of a codable material, as well as partial layers 6 with a soft cleaning material, according to FIGS. 1–4, consists of preferably of a two-sided coatable foil of, for example, a thickness of 800 µm and of preferably a thermoplastic material, such as PVC (polyvinyl chloride), PET (polyethylene terepthalate), ABS (acrylonitrile butadiene styrene), PC (polycarbonate), and the like, as well as mixturizing and modifying base materials, such as PC/ABS, PETG, APET, PMMA, and the like. Through the structuring of the plastic material carrier 2 the bonding ability of the coatings 4,6 can be improved.

In accordance with the invention, the cleaning material 6 on the carrier 2 consists of a fiber flock with individual fibers 6' (FIG. 4) extending generally vertically from the carrier, and tightly packed and adhesively attached to the carrier, with predetermined lengths and predetermined diameters. For this, the predetermined surface areas for the cleaning material on at least one side of a card are coated by screen printing processes with a two-component adhesive 8 and then tightly packed individual fibers 6' of predetermined length and predetermined diameter are inserted into the adhesive beds of the individual surface areas, generally perpendicular to the carrier. Thereafter the flat plastic carrier with the layers can be subjected to a drying process, whereupon and thereafter the non-bonded remaining fibers can be washed away.

The method for manufacturing a so-called fiber flock is known in itself, wherein the individual fibers are separated by a screen and arranged parallel to one another, whereupon the ends of the fibers are electrostatically charged in order to be able to insert the fibers perpendicularly into the adhesive material bed.

As shown in FIGS. 1 and 3, the cleaning card includes a chip contact side (FIG. 1) and a magnetic head side (FIG. 3), on which the fiber flock cleaning material 6 is arranged in several pre-given surface areas. Thereby the individual fibers 6' of the fiber flock cleaning material 6 on the pre-given surface areas on the one or the other of the cards side can be of the same or different lengths, for example 0.5 to 1.5 mm and the same or different diameter, for example 3.3 to 6.7 dtex.

The magnetic head side (FIG. 3) moreover carries partial layers 4 of codable material, herein in the form of a several layered color print.

The uncoated surface sections of the cleaning card can be printed with information.

As already mentioned, such a cleaning card in a condition of having been moistened with a liquid cleaning material, for example Vertrel XF-P35, can be enclosed in a tear-open bag (not shown). For the manufacture of such cleaning cards, a flat, plastic material carrier separable into several cards is preferably partially coated with a codable material, as well as with a soft cleaning material. The codable material is printed in the form of a pigmented screen-printed color in several screen printing processes then pre-given surface areas on at least one side of the card for the cleaning material are layered in a screen printing process with a two-component adhesive. As the cleaning material tightly-packed individual fibers of predetermined length and predetermined diameter are set essentially perpendicularly into the adhesive beds; the flat plastic carrier with the coatings is subjected to a drying process; and thereafter the non-bonded remaining fibers are washed away.

Thereafter the flat plastic carrier is cut to form several cleaning cards; and as the case may be, the codable surface areas are coded. The individual cleaning cards are then moistened with a cleaning liquid and each is encased in a tear-open bag.

Figure 6:
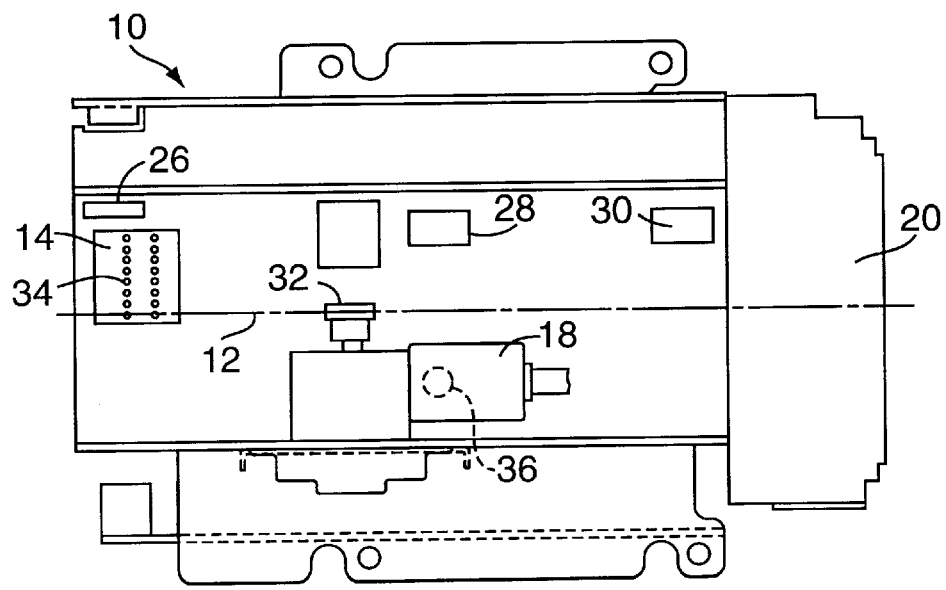
FIG. 6—a schematic section along the line VI—VI in FIG. 5 parallel to the card transport plane in the writing/reading device.

FIGS. 5 and 6 show a writing/reading device, known in itself, for identification cards and which here is illustrated with only its only most important components. It includes a frame 10; and inside of this frame, along a transport path 12 are a chip contact station 14, a magnetic head 16, and an optical sensor 18, and a so-called MM-Sensor are arranged. At the entrance end of the device is arranged a closure unit 20 which contains a further magnetic head 22, as well as a movable closure 24. To draw in and discharge an identification card along the transport path 12, transport roll pairs 26,28, 30 are arranged laterally of the transport path. The magnetic head 16 has associated with it a further roll 32 which presses the identification card against the magnetic head.

The inventive cleaning card illustrated in FIGS. 7 and 8 is to make possible the cleaning of the contact elements 34 of the chip card station, of the magnetic head 16, and of the sensor eye 36 of the sensor 18 (FIG. 6) from the rear side of the device, that is, from the left side as seen in FIGS. 5 and 6. The cleaning card includes an elongated, rectangular plastic carrier 38, consisting of, for example, PVC, PET, ABS, PC, and other materials, as well as mixturizing and modifying base materials such PC/ABS, PETG, APET, PMMA, and the like.

On its one side the plastic carrier 38 has two surface areas 40 and 42 each of which is coated with a fiber flock serving as the cleaning material. The first surface area 40 is associated with the chip contact station 14, while the second surface area 42 is associated with the sensor 18. The length of the fibers in these two areas 40 and 42 is between 6.5 and 10 mm, preferably 8 mm. The fiber thickness is between 33 and 90 dtex, preferably 67 dtex. The arrangement of the surface areas 40 and 42 on the plastic carrier 38 is so-chosen that the areas 40 and 42 upon the insertion of the cleaning card from the rear side of the device lie simultaneously under the chip contact station 14 and under the sensor 18. Since in this case at the time of cleaning the contact elements 34 of the chip contact station 14 are not lowered, in the surface area 40 the relatively long fibers of preferably 8 mm length are also required.

On the opposite side, the plastic carrier 38 has two strip-shaped surface areas 44 parallel to one another, which likewise are coated with fiber flock and serve for the cleaning of the magnetic head 16. The length of the fibers in these areas is between 0.3 and 2 mm, preferably 0.5 to 1 mm. Their thickness is between 1.7 and 6.8 dtex, preferably 3.3 dtex.

The cleaning card illustrated in FIGS. 7 and 8 is lengthened toward the right by a grip section 46 by means of which the card can be easily inserted into the device.

Further, the cleaning card can be provided with a non-illustrated surface area having a codable material, especially magnetic strips. The information applied to these codable strips can, for example, serve to effect a movement of the cleaning card inside of the writing/reading device.

What is claimed is:

1. A cleaning card for a magnetic track and chip card writing/reading device, said card comprising a card-shaped carrier (2;38), which carrier is partially coated with a soft cleaning material (6) arranged on at least two flat pre-given surface areas (40,42,44) of the carrier (2;38), the cleaning material (6) consisting of a fiber flock with individual fibers (6') tightly packed and extending generally perpendicularly from the carrier (2;38), the fibers being adhesively bonded to the carrier and being of pre-given length and pre-given diameter, and the length of the individual fibers of the fiber flock cleaning material (6) on at least one of the pre-given surface areas (40,42,44) on one or the other of the sides of the card being different from the length of the individual fibers on the other surface areas, with the individual fibers on the different surface areas being of the same or different diameters.

2. A cleaning card, according to claim 1, wherein the fiber flock cleaning material (6) is applied to several pre-given surface areas arranged on at least one side of said card.

3. A cleaning card, according to claim 1, wherein the card is enclosed in a bag in a condition of having been moistened with a liquid cleaning material.

4. A cleaning card, according to claim 1, for use with a writing/reading device having a chip contact station, a magnetic head and an optical sensor, and wherein said card when inserted into the device has a first surface area (40) registered with the chip contact station of the writing/reading device, a third surface area (44) registered with the magnetic head of the writing/reading device; and a second surface area (42) registered with the optical sensor of the reading/writing device.

5. A cleaning card, according to claim 4, wherein the fiber length of the fiber flock material in the first and second surface areas (40,42) is about 6.5 to 10 mm.

6. A cleaning card, according to claim 5, wherein the fiber thickness in the first and in the second surface areas (40,42) is about 33 to 90 dtex.

7. A cleaning card, according to claim 6, wherein the fiber thickness in the first and second surface areas (40, 42) is about 67 dtex.

8. A cleaning card, according to claim 5, wherein the fiber length of the flock material in the first and second surface areas (40, 42) is about 8 mm.

9. A cleaning card, according to claim 4, wherein the fiber length of the fiber flock material in the third surface area (44) is about 0.3 to 2 mm.

10. A cleaning card, according to claim 9, wherein the fiber thickness in the third surface area (44) is about 1.7 to 6.8 dtex.

11. A cleaning card, according to claim 10, wherein the fiber thickness in the third surface area (44) is about 3.3 dtex.

12. A cleaning card, according to claim 9, wherein the fiber length of the fiber flock in the third surface area (44) is about 0.5 to 1.0 mm.

13. A cleaning card, according to claim 4, wherein the first and second surface areas (40,42) are arranged on one side of the card-shaped carrier (38) and the third surface area (44) is arranged on the other side of the carrier (38).

14. A cleaning card, according to claim 4, wherein the carrier (38) is connected with a grip section (46) extending in the insertion direction of the card.

15. A cleaning card, according to claim 1, wherein the card-shaped carrier (2;38) is partially coated with a codable material.

16. A cleaning card, according to claim 1, wherein the card-shaped carrier (2;38) is made of plastic.

17. A method for manufacturing a cleaning card for magnetic track and chip card writing/reading devices in which a flat plastic carrier separable into several cards is partially coated with a soft cleaning material, said method comprising:

on at least one side of the plastic carrier coating by a screen printing process individual surface areas for screening the cleaning material with a two-component adhesive to form adhesive material beds;

setting as cleaning material tightly-packed individual fibers of predetermined length and predetermined diameter essentially perpendicularly into the adhesive material beds of the individual surface areas;

submitting the flat plastic carrier to a drying process; and thereafter washing away the non-bonded remaining fibers.

18. A method, according to claim 17, wherein the plastic carrier is additionally partially coated with a codable material which codable material is in the form of a pigmented screen print color printed in several screen printing processes.

19. A method, according to claim 18, wherein the flat plastic carrier is cut to form several cleaning cards and the codable surface areas are coded.

20. A method, according to claim 17, wherein the individual cleaning cards are moistened with a cleaning liquid and each is encased in a bag.

* * * * *